350-269 SR
7/10/79 OR 4,160,582

United States Patent [19]

Yasuo

[11] 4,160,582

[45] Jul. 10, 1979

[54] ELECTROSTATIC DISPLAY ASSEMBLY

[75] Inventor: Sasaki Yasuo, Kobe, Japan

[73] Assignees: Displaytek Corporation; Daiwa Shinku Corporation, both of Japan

[21] Appl. No.: 891,114

[22] Filed: Mar. 28, 1978

[30] Foreign Application Priority Data

Apr. 1, 1977 [JP] Japan ............................ 52-41448[U]

[51] Int. Cl.² .............................................. G02F 1/00

[52] U.S. Cl. .................................... 350/269; 350/359

[58] Field of Search ............... 350/359, 360, 269, 266, 350/285, 270

[56] References Cited

U.S. PATENT DOCUMENTS

| | | | |
|---|---|---|---|
| 3,553,364 | 1/1971 | Lee | 350/269 |
| 3,897,997 | 8/1975 | Kalt | 350/269 X |
| 3,989,357 | 11/1976 | Kalt | 350/360 |
| 4,094,590 | 6/1978 | Kalt | 350/360 X |

*Primary Examiner*—Andrew J. James

*Assistant Examiner*—James W. Davie

*Attorney, Agent, or Firm*—Wenderoth, Lind & Ponack

[57] ABSTRACT

An electrostatic display assembly including a plurality of channel shaped casings fixed to an insulating base plate into a line, each casing having a pair of side walls, a fixed electrode extending throughout the length of the casings therein, a resilient sheet electrode supported within each casing so that a pair of flaps of the sheet electrode extend upwards adjacent to the fixed electrode along the inner surface of each casing, and a thin layer of insulating material interposed between the outer surface of the fixed electrode and the inner surfaces of the resilient sheet electrodes, whereby upon the application of voltage between the fixed electrode and any one of the resilient sheet electrodes which are electrically independent of each other, that flaps of the sheet electrode are attracted to the surface of the fixed electrode and covers the same in part, changing the appearance of the assembly.

3 Claims, 3 Drawing Figures

ELECTROSTATIC DISPLAY ASSEMBLY

The present invention relates to an electrostatic display assembly comprising a plurality of channel shaped casings disposed into a line, a fixed electrode extending throughout the length of the casings, and a resilient sheet electrode within each casing, an insulating layer being interposed between the fixed electrode and each resilient sheet electrode, whereby upon the application of a voltage between the fixed electrode and each sheet electrode independently of the others, that sheet electrode is attracted to the fixed electrode and covers the same, changing the appearance of the assembly.

U.S. Pat. No. 3,897,997 to Kalt discloses an electrostatic display device of this type. The device, referring to FIG. 1, has a fixed electrode 12 having a cylindrical surface and fixed to a base 11 and a resilient sheet electrode 13 fixed to the base at one end 14 thereof so that the resilient sheet electrode stands adjacent to the fixed electrode in contact therewith at a portion. At least, either the outer surface of the fixed electrode or the inner surface of the resilient sheet electrode is covered or coated with a thin layer of insulating material 15. The resilient sheet electrode 13 consists of, for example, a resilient polymer film as a core such as polyethylene terephthalate film with an electrically conductive metal like aluminum vacuum deposited thereon. A d.c. power source 32 is connected to both the electrodes through lead wires 16 so that a d.c. voltage can be applied between the electrodes.

When there is no voltage between the electrodes, the resilient sheet electrode extends upwards flatly, as will hereinafter ba called as the off-state. However, the application of voltage between the electrodes causes the resilient sheet electrode to be pulled towards the surface of the fixed electrode and cover the same, as will hereinafter be called as the on-state. Since the resilient sheet electrode flaps in this way on applying a voltage between the fixed electrode and the resilient electrode, various display can be realized when the appearance of the outer surfaces of the two electrodes are different from each other, for example, in their reflectivity, color or patterns they carry.

The above device is expected to be used in a wide variety of display since it has many advantages. For example, the device has memory function as well as complicated display function. In addition, the device requires less power. However, it is also true that the device is rather complicated and some difficulties are encountered when assembling.

For example, the least damage to the flatness of the resilient sheet electrode, which is preferably of the polymer film of about 8 microns in thickness as beforementioned, due to wrinkles or bends generated when the electrode is manufactured or assembled resists the smooth flapping of the resilient sheet electrode. In particular, bonding of the resilient electrode to a base at one end thereof by the use of electrically conductive adhesive is apt to produce wrinkles at the bonded portion of the electrode. Fixing the resilient electrode to a base with screws also damages the flatness of the electrode.

It is therefore an object of the invention to provide an electrostatic display assembly in which the resilient electrode is supported in such a manner that the smooth flapping of the electrode is ensured, obviating the defects involved in the prior device.

It is another object of the invention to provide an electrostatic display assembly in construction and assembling.

Other objects and features of the invention will be apparent from the following description with reference to the accompanying drawings, in which.

Throughout the drawings, similar parts and elements are shown by the similar reference numerals.

Figure 2:
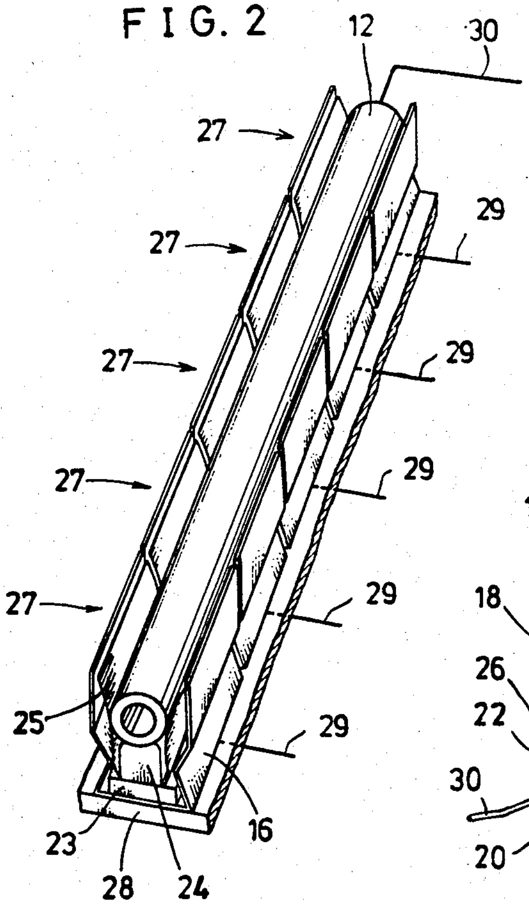
FIG. 2 is a schematic view of an embodiment of the electrostatic display assembly of the invention.

Referring now to FIG. 2, a casing 16 is of electrically conductive material such as aluminum substantially in the form of U-shaped channel. The casing 16 has a flat bottom 17 and a pair of side walls 18 standing opposite to each other. Each side wall has a depression 19 which extends in the longitudinal direction of the casing. In other words, each side wall is bent inwardly at the lower portion thereof so that the distance between the side walls becomes shorter as the side wall extends upwards. When reaching the bottom 20 of the depression 19, the side wall is bent outwardly, extending upwards to reach a bent portion 22 at a small distance above the bottom 20 of the depression. Beyond the bent portion, the side wall stands erect.

A lower supporting plate 23 is fixed on the flat bottom 17 of the casing 16, and an upper supporting plate 24 is laid upon the lower plate 23. Between the plates 23 and 24, a resilient sheet electrode 13 is interposed so that each side of the electrode is upturned and extends upwards along the inner surface of the side wall 18. The resilient sheet electrode 13 is preferably of the polymer film of about 8 microns in thickness as beforementioned with an electrically conductive metal such as aluminum vacuum deposited thereon. The resilient sheet electrode can be fixed between the lower and upper supporting members 23 and 24, for example by spot welding, bonding with electrically conductive adhesives, etc. A lead wire 29 is electrically connected to each resilient sheet electrode 13.

A plurality of resilient sheet electrode elements 27 as mentioned above are disposed at short intervals into a line and fixed to a base plate 28 of insulating material. These sheet electrode elements thus disposed has a fixed electrode 12 in common which extends throughout the length of the elements 27. The fixed electrode 12 is of an electrically conductive material such as aluminum with the outer surface thereof coated or covered with a thin layer of insulating material in the form of cylinder. Preferably, at least the visual portion from the above is color painted. The fixed electrode is fixed within the casings 16, for example, by bonding to the upper face of the upper supporting plate 24. Inside the cylindrical fixed electrode there is inserted an electrically conductive metal piece 31, for example, hair pin shaped resilient phosphor bronze piece, and is forced into contact with the inner surface of the fixed electrode. A lead wire 30 is connected to the metal piece 31.

According to the invention, the outer surface of the fixed electrode or the inner surface of the resilient sheet electrodes, or both, are provided with layers of insulating material. When the fixed electrode has no layer of insulating material, the fixed electrode is fixed on an insulating plate (not shown), and the plate is in turn fixed to the upper face of the supporting plate 24.

Figure 3:
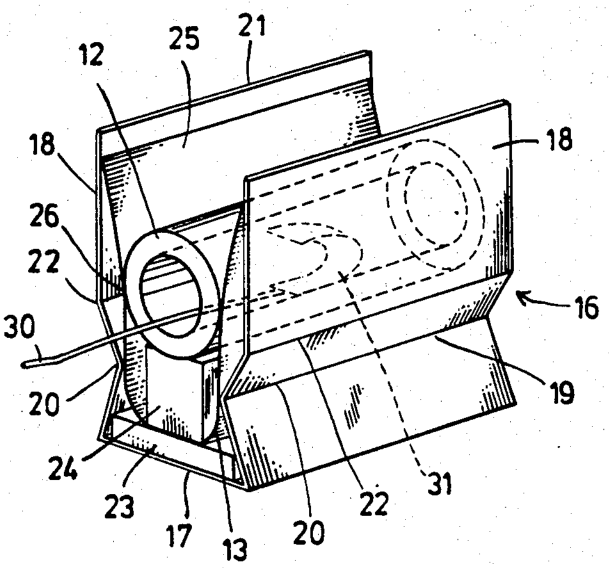
FIG. 3 is an enlarged schematic view of the assembly in part.
Figure 1:
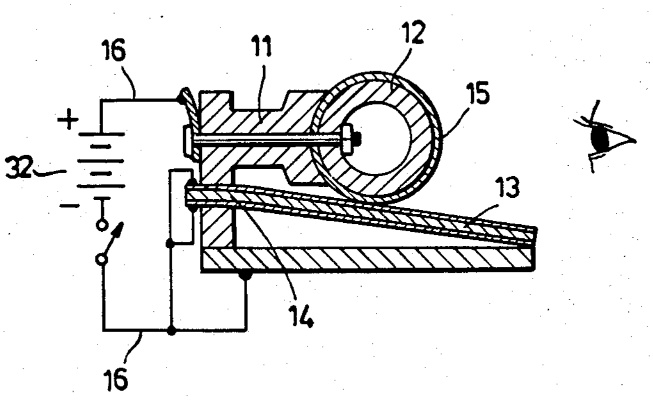
FIG. 1 PRIOR ART
FIG. 1 is a sectional view of prior electrostatic display device.

In the display assembly of the invention as above, the variable electrode 13 of each element 27 is upturned by being pushed inwardly by the bottom 20 of the depression 19 at the lower portion of the casing, and forced to extend upwards adjacent to the outer surface of the fixed electrode 12 in contact therewith at a portion 26 as shown in FIG. 3.

Thus, when no voltage is applied between the fixed electrode and the sheet electrodes, the sheet electrodes are in the off-state. However, upon the application of voltage between the fixed electrode and any one of the resilient sheet electrodes which are electrically independent of each other, that sheet electrode is attracted to and covers the surface of the fixed electrode in part in a moment.

According to the invention, since both of the fixed electrode and the resilient sheet electrodes are contained within the casings in the form of channel serving as a means of electrostatic shielding for the element as well as position guide of the sheet electrodes in the off-state, neither electrostatic nor mechanical interference is caused if the elements or assemblies are disposed densely, and as a result, stable operation of the assembly is ensured. Furthermore, the resilient sheet electrode is sufficiently supported by only interposing it between the supporting plates if desired, so that no wrinkles or bends are produced at the interposed portion of the sheet electrode. As apparent, the assembly is very simple in construction and assembling.

As examples of applications of the electrostatic assembly of the invention, it is suitable for use in on-and-off display, guiding instrument to a fixed direction, analogue display, matrix display and the like. The assembly is also suitable for use in massage or pattern display.

What is claimed is:

1. An electrostatic display assembly comprising:
   - a base of insulating material;
   - a plurality of channel shaped casings fixed to the base into a line, each casing having a pair of side walls opposite to each other;
   - a pair of supporting plates laid one on the other within each casing;
   - a fixed electrode with a cylindrical surface extending throughout the length of the plurality of casings within the same;
   - a resilient sheet electrode interposed between the supporting plates in each casing so that each side of the resilient sheet electrode is upturned and extends upwards adjacent to the fixed electrode along the inner surface of the side wall of the casing;
   - a layer of insulating material disposed between the fixed electrode and the resilient sheet electrodes; and
   - a means for applying a voltage between the fixed electrode and each of the resilient sheet electrodes which are electrically independent of each other, the outer surface of the fixed electrode and the inner surfaces of the resilient sheet electrodes being different in appearance from each other, whereby upon the application of a voltage between the fixed electrode and at least one of the resilient sheet electrodes independently of the others, the at least one of the resilient sheet electrodes are attracted to the surface of the fixed electrode and cover the same, causing a distinct change in the appearance of the assembly.

2. An electrostatic display assembly as claimed in claim 1, wherein the casing has a longitudinal depression at each lower portion of the side walls so that each side of the resilient sheet electrode is upturned and extends upwards by being pushed inwardly at the lower portion of the resilient sheet electrode by the bottom of the depression.

3. An electrostatic display assembly as claimed in claim 1 further comprising a resilient and electrically conductive piece with a lead wire connected thereto inserted into the fixed electrode.

* * * * *

UNITED STATES PATENT AND TRADEMARK OFFICE
CERTIFICATE OF CORRECTION

PATENT NO. : 4,160,582

DATED : July 10, 1979

INVENTOR(S) : Sasaki YASUO

It is certified that error appears in the above-identified patent and that said Letters Patent are hereby corrected as shown below:

Title page, line [75], change inventor's name "Sasaki Yasuo" to read --Yasuo Sasaki--.

Signed and Sealed this

*Twenty-seventh* Day of *November 1979*

[SEAL]

*Attest:*

RUTH C. MASON
*Attesting Officer*

LUTRELLE F. PARKER
*Acting Commissioner of Patents and Trademarks*